United States Patent
Jones

[15] 3,670,097

[45] June 13, 1972

[54] STEREOSCOPIC TELEVISION SYSTEM AND APPARATUS

[72] Inventor: James L. Jones, San Jose, Calif.

[73] Assignee: The United States of America as represented by the Administrator of the National Aeronautics and Space Administration

[22] Filed: Oct. 20, 1969

[21] Appl. No.: 867,842

[52] U.S. Cl. .......................... 178/6.5, 178/DIG. 20, 350/138
[51] Int. Cl. .......................... H04n 7/00
[58] Field of Search ................ 178/61 ND, 6.5, 7, 8; 350/138

[56] References Cited

UNITED STATES PATENTS 3,205,303 9/1965 Bradley .................................. 178/6

FOREIGN PATENTS OR APPLICATIONS 505,602 5/1939 Great Britain ..................... 350/138

*Primary Examiner*—Robert L. Griffin
*Assistant Examiner*—Barry Leibowitz
*Attorney*—Darrell G. Brekke and G. T. McCoy

[57] ABSTRACT

A novel stereoscopic remote viewing system is provided including a remote camera unit having means for projecting a pair of binocular images of a remote object through a common lens system onto the sensitive face of a single television camera tube for transmission to a viewing unit having a television picture tube which may be viewed through a binocular image separation system that enables the viewer to see a stereoscopic image of the remote object. Means are provided in the remote camera unit for inverting one of the two images and then causing the two images to be projected mirror symmetrically onto the camera tube through the common lens system. Because of this image symmetry, distortion produced by the lens system or camera tube similarly affects both images. Means are provided in the image separation system of the viewing unit for transposing the transmitted inverted image and producing binocular separation of the images.

17 Claims, 5 Drawing Figures

INVENTOR
JAMES L. JONES
BY
ATTORNEYS

INVENTOR
JAMES L. JONES

BY [signature]
[signature]
ATTORNEYS

STEREOSCOPIC TELEVISION SYSTEM AND APPARATUS

The invention described herein was made by an employee of The United States Government and may be manufactured and used by or for the Government for governmental purposes without the payment of any royalties thereon or therefor.

BACKGROUND OF THE INVENTION

The present invention relates generally to three-dimensional television systems and, more particularly, to a novel system for enabling one to selectively view a remote object stereoscopically and free of the distortions common in prior art systems.

The concept of utilizing television techniques to transmit stereo optical information has been used for some time. The two most common methods used to achieve this object are (1) to use two separate television cameras and two separate television receivers to separately transmit the left and right optical images respectively, and (2) to transmit both left and right images via the same single channel television system by displaying the similar images side-by-side on a single television screen but using separate optical systems to redivide the images.

The first method is troubled by differences in contrast and brightness between images produced by the respective transmission systems as well as by the various nonlinearities which occur as a result of the differing component characteristics of the respective transmission and display systems.

The second method is not subject to the contrast and brightness deficiencies of the formerly mentioned system, but is likewise objectionable. In this instance the objectionable characteristic is the nonsimilar distortion which occurs in the two images due primarily to the horizontal nonlinearities of the picture tube they are displayed on. Where two like images are displayed in side-by-side relationship on a television picture tube, the relative distortions produced by the horizontal nonlinearities of the display tube produce distortions which are not substantially the same in both images. This causes a blurring effect when the two are later superimposed by the viewers eyes and results in objectionable viewer eye strain.

More generally, the previous approaches have encountered such difficulties because the multiple optical and video loops employed are not able to achieve consistently similar images due to such factors as relative variation in tone or gray scale, relative focusing and magnification disparities, and image distortion produced by electrical and optical imperfections. Since the images produced in such systems are not comparable, one using the system to vacariously view remote objects will be unable to accurately discern the desired depth characteristics and will thus not be capable of performing intended functions with consistent accuracy.

Examples of prior art three-dimensional television systems can be found in the U.S. Pats. to Marks No. 2,961,486, Owens No. 3,020,341, Beste No. 3,251,933 and Ratliff No. 3,291,904.

OBJECTS OF THE INVENTION

It is therefore a principal object of the present invention to provide a novel remote viewing system for enabling a user to stereoscopically view a remote image in color, or in black and white, using a television medium.

Another object of the present invention is to provide a stereoscopic remote viewing system for enabling one to visually inspect a remote object.

Still another object of the present invention is to provide a stereoscopic remote viewing system utilizing conventional television techniques and optical principles.

Still another object of the present invention is to provide an improved stereoscopic remote viewing system which enables one to selectively inspect a remote object using a minimum of manual controls.

Still another object of the present invention is to provide an improved stereoscopic television viewing system having means for compensating for system nonlinearities and distortions.

SUMMARY OF THE INVENTION

In accordance with the present invention, a novel stereoscopic remote television viewing system is provided including a remote camera unit wherein a pair of binocular images of an object are projected through a common lens system onto the face of a single television camera tube for transmission to a viewing unit having a single television picture tube which is viewed through a binocular image separation system that enables the viewer to see a stereoscopic image. Means are provided in the remote camera unit for inverting one of the two images and causing the images to then be projected in mirror symmetry onto the sensitive face of the camera tube through the common lens system. Because of this image symmetry, distortions produced by the lens systems or transmission media similarly affect both images. Means are provided in the image separation system of the viewing unit for transposing the transmitted inverted image.

Among the advantages of the present invention is that both of the images transmitted are passed through the same sets of optical lenses and television transmission and receiving systems, so as to eliminate the possibility of differences in the respective image tone and gray scales, disparities in relative focusing and magnification, and nonsimilar distortions produced by electrical and optical imperfections.

Other advantages will be apparent to those skilled in the art after having read the following detailed disclosure which makes reference to the several figures of the drawings.

IN THE DRAWINGS

DETAILED DESCRIPTION OF THE INVENTION

Figure 1:
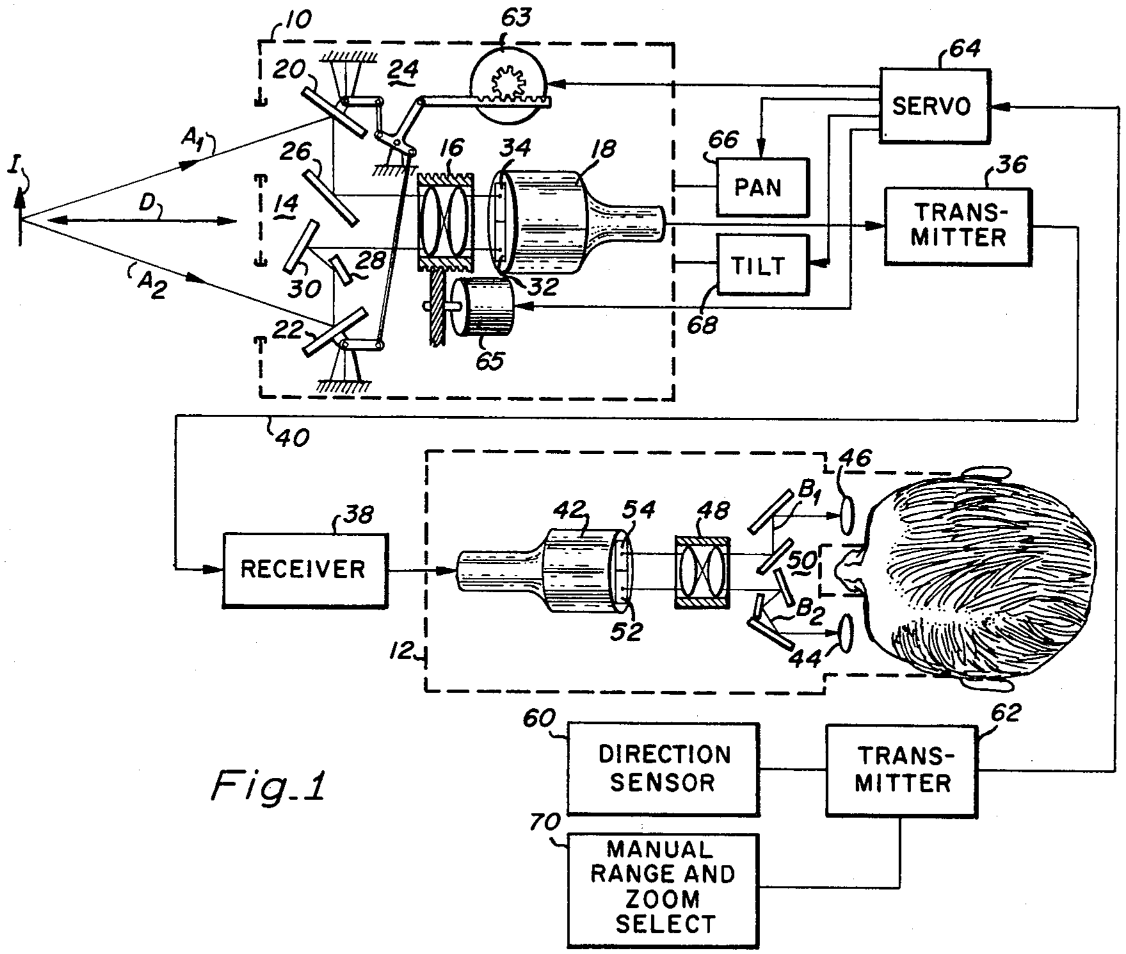
FIG. 1 is a schematic diagram of a stereoscopic remote viewing system in accordance with the present invention.

In FIG. 1 of the drawings, there is shown a stereoscopic remote viewing system in accordance with the present invention which includes a remote camera unit 10 and a user viewing unit 12. The remote unit 10 includes a reflective light transmission system 14 which provides a binocular set of images that are projected through the lens system 16 onto the face of a television camera tube 18. The reflective system 14 includes a pair of rotatable mirrors 20 and 22 which are linked together by a suitable linkage 24 so that by means of a single control they can be caused to respectively rotate in opposite directions so as to change the range of convergence of the respective optical axes of the system employing the two mirrors. In other words, by opening the relative angle between the two mirrors, the distance D between the remote apparatus 10 and the object plane can be increased. Conversely, by decreasing the angle between the mirrors 20 and 22 the distance D can be decreased.

Light rays emanating from the object I in the direction of the mirror 20 are reflected thereby onto the reflective face of a fixed mirror 26, which in turn reflects the light rays into the optical system 16. Similarly, light rays emanating from the object I in the direction of the mirror 22 are reflected thereby onto the reflective face of a fixed mirror 26 and thence onto the reflective face of another fixed mirror 30 which in turn reflects the light rays into the lens system 16. The lens 16, in a preferred embodiment, is a zoom-type lens which enables a close-up view to be obtained of the object I appearing in the selected object plane.

Figure 2:
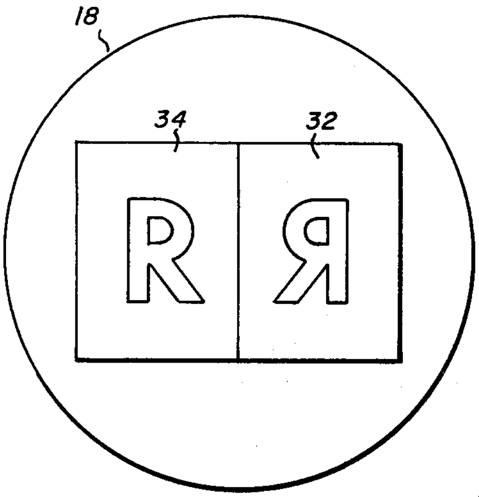
FIG. 2 illustrates the form of the binocular images which are projected onto the face of the television camera tube in accordance with the present invention.

Since the two light paths $A_1$ and $A_2$ enter the lens system 16 in sidetby-side parallel relationship, i.e., each image is focused onto different halves of the optical aperture of the lens system 16, they will in turn be imaged onto different areas of the face of the TV camera tube 18. Moreover, since the number of reflections appearing along the optical axis $A_1$ is an even number and the number of reflections appearing along the optical axis $A_2$ is an odd number, the image 32 appearing on the face of the camera tube will be reversed, or inverted, with respect to the image 34. That is to say that the two images will have substantial mirror image symmetry about the center of the face of the camera tube 18 as illustrated in FIG. 2 of the drawings.

It will be noted that since the images 32 and 34 are mirror symmetrical and are passed through a single lens system in side-by-side relationship, any circularly symmetric aberrational characteristics of the lens system 16, be it monochromatic or chromatic, will affect each of the images 32 and 34 similarly. Thus, the two images may be electronically transmitted and reproduced, and then binocularly superimposed without significant nonlinear relative distortion. Moreover, since the camera tube itself is inherently subject to sweep nonlinearities which are analogous to the optical aberations of a lens system, this mirror symmetrical disposition of similar images upon the faces of the cathode ray tube likewise balances the effects of the tube nonlinearities on the respective images.

The output of the camera tube 18 is fed into a transmitter 36 which is communicatively coupled to a receiver 38 by a suitable data link 40. The receiver 38, in turn, supplies picture information to a television receiver tube 42 which forms a part of the viewing unit 12. The two images formed on the face of the tube 42 are separated and individually focused into the eyepieces 44 and 46 of the viewing apparatus 12 by a suitable lens means 48 and reflective system 50.

Figure 3:
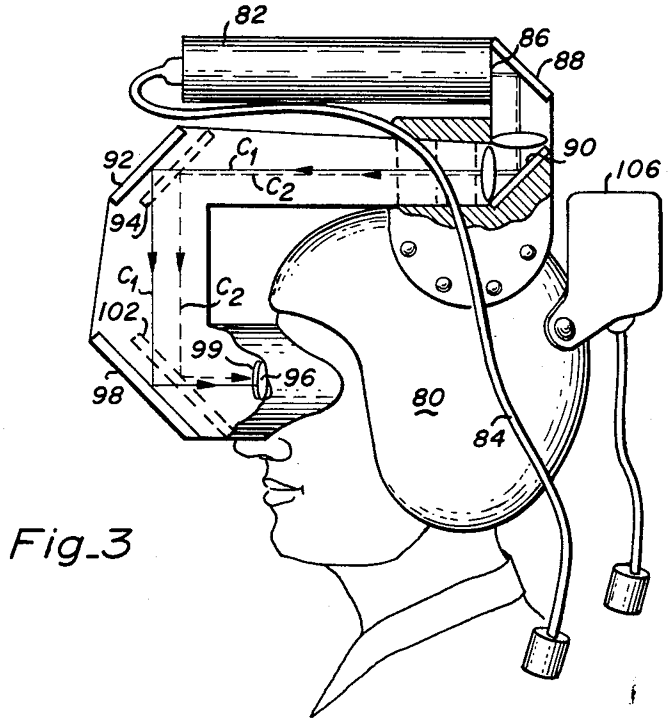
FIG. 3 illustrates an operative embodiment of a stereoscopic remote viewing apparatus in accordance with the present invention.
Figure 4:
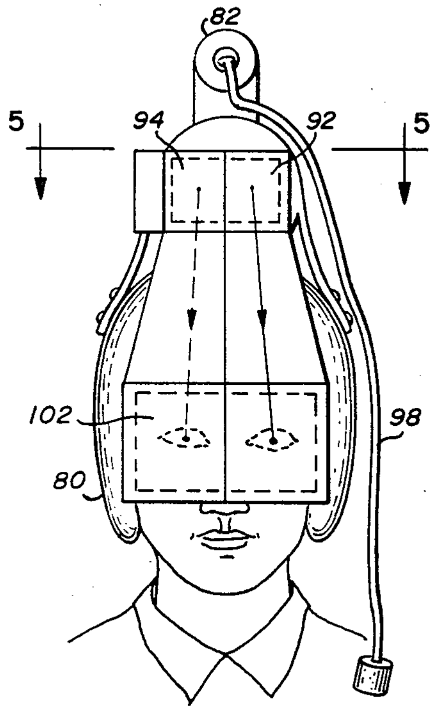
FIG. 4 is a frontal view of the apparatus illustrated in FIG. 3.

The image 52 is reflected an even number of times in passing along the path $B_1$ and so appears at the eyepiece 46 in the same phase that it appears on the face of the tube 42. However, the image 54, which is inverted as it appears on the face of the tube 42, must be reversed before being presented to the eyepiece 44. This is accomplished in a manner similar to that used to obtain the inverted image in the first place in the remote unit 10, that is by merely utilizing an odd number of mirrors in the optical path $B_2$. It must be noted that in both mirror systems 14 in the remote unit 10, and mirror system 50 in the viewer unit 12, care must be taken to insure that the optical path lengths of the respective left and right light paths are equal.

Where the present invention is to be utilized in a system which enables the selective scanning of a remote field of view, it may be found desirable to mount the entire unit 12 upon the head of the user in a manner such as that illustrated in FIGS. 3 and 4. In such an application, a direction sensing means 60 may be provided for sensing changes in head orientation so as to cause similar orientation or direction of the remote unit 10. This is accomplished by feeding the output of the direction sensor 60 into a transmitter 62 which controls a remote servo unit 64 that, in turn, provides appropriate drive signals to a "-pan" control 66 and a "tilt" control 68.

This enables the operator to selectively inspect the field of view by merely turning his head in a manner similar to that which he would normally do were he himself at the remote position. In order that he may select the range of focus and perhaps telescopically view a selected object, manual range and zoom select controls 70 are provided which produce output signals that are also transmitted via transmitter 62 to the servo 64 for controlling the range control motor 63 and the zoom control motor 65. Thus, in accordance with the present invention, a complete remote viewing system is provided which enables a substantial duplication of view to be obtained by the operator as if he himself were present at the remote location.

Figure 5:
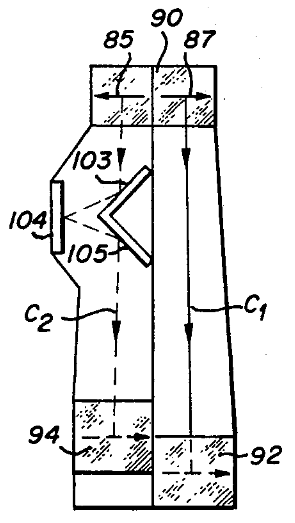
FIG. 5 is a cross section taken along the line 5—5 of FIG. 4.

Turning now to FIGS. 3, 4 and 5 of the drawings, an actual embodiment of the receiver end of the present invention is illustrated. In accordance with this embodiment, the entire optical viewing unit is mounted on a helmet 80 which is worn by the operator. The input signal from the remote transmitter is received by suitable receiver apparatus and the output thereof is coupled into the television camera tube 82 through interconnect means 84.

The respective images 85 and 87 appearing on the face 86 of the camera tube 82 are reflected by a mirror 88 through a lens system and second reflector 90 (see FIG. 5) and thence into a pair of reflectors 92 and 94 which are positioned so that one of the optical images falls on each. The mirrors 92 and 94 are slightly canted outwardly with respect to the parallel ray paths of the incident light beams so as to initiate a slight separation of the two beams as they are reflected downwardly toward the eyepieces. The reflectors 98 and 102, however, are canted oppositely with respect to the mirrors 92 and 94 so that the optical paths $C_1$ and $C_2$ will again be oriented parallel to the direction they had before striking the mirrors 92 and 94. This causes the images to enter the eyepieces 96 and 99 along the optical axes thereof.

In order that the inverted image 85 which is reflected onto the mirror 90 may be horizontally reversed, or inverted, prior to reaching the eyepiece 99, three mirrored surfaces 103, 104 and 105 are interposed at a suitable point between the reflectors 90 and 94 for providing the desired inversion. Because of the optical distance lost in the reflections between the mirrors 103 and 104, and 104 and 105 the reflectors 94 and 102 are positioned rightwardly of the reflectors 92 and 98 as seen in FIG. 3 to make up for the loss. Alternatively, a dove prism may be used in place of the three mirrors 103, 104 and 105 to accomplish the image inversion.

In order to provide the controlled correspondence between the head-mounted viewing unit and the remote camera unit, a suitable direction sensor 106 is coupled to the helmet 80 for producing control signals which may be transmitted to the viewing unit. The direction sensor 106 may, for example, be of the gyroscopic motion following type or may be of any other suitable type of two-dimensional direction sensing apparatus.

In accordance with the present invention, a novel stereoscopic remote viewing system is provided which reduces relative image dissimilarities to a minimum by using the same lens systems and transmission system for transmitting the respective images to each eye of the observer. This is, as explained in detail above, made possible by the use of dual reflective systems which cause the images to be projected adjacent to one another onto and away from the photosensitive surfaces of the television transmission apparatus through common lens systems. In accordance with the present invention, compatible visual images are obtained for presentation to the viewer's eyes. Although specific reflective combinations have been illustrated, it is to be understood that these are merely illustrative and any other suitable arrangements may be used to provide equal optical path lengths and proper image orientations.

The many fields of utility of the present invention will be readily apparent to those skilled in the art. For example, such apparatus will have great utility in such applications as the visual guidance of various types of land, sea and space vehicles wherein it is not practical for the controller to directly view the intended path. Furthermore, the present invention will have great utility in those areas where it is hazardous or other wise impossible for a human being to be physically present, such as in the handling of radioactive materials or in environments where temperature conditions do not permit human exposure.

Moreover, the present invention in a preferred embodiment provides freely selective three-dimensional vision of remote objects while leaving the hands of the operator free for operation of various instruments and therefore very nearly duplicates actual presence of the operator at the remote viewing site.

Although the means of transmitting the set of binocular images has been disclosed herein as being in the form of a television system, it is contemplated that other images or facsimile transmission systems may be incorporated into the novel system. For example, a fiber optics light transmission medium may be used to transmit the pair of images from the remote scanner to the viewer in applications where sufficient light intensity levels are encountered.

While the present invention has been described with reference to specific preferred embodiments, it is contemplated that many alterations and modifications thereof will become apparent to those skilled in the art after having read the foregoing description. It is therefore to be understood that this disclosure is for purposes of illustration only and is in no manner intended to be limiting in any way. Moreover, it is intended that the appended claims be interpreted as covering all modifications which fall within the true spirit or scope of the invention.

What is claimed is:

1. A stereoscopic remote viewing system comprising:
a pickup for converting input images to a video signal;
binocular object inspection means for simultaneously providing a pair of images of the same object as viewed from displaced locations along separate optical paths, said binocular inspection means including means for inverting one of said images before causing said images to be focused onto said pickup in side-by-side mirror-symmetric relationship;
a remote receiver having a video display;
means for transmitting said video signal to said receiver wherein side-by-side, mirror-symmetric images representative of said images focused on said pickup are displayed;
binocular image viewing means including two eyepieces;
optical means between said video display and said eyepieces for providing first and second isolated optical paths so that only one image can be viewed from each eyepiece;
said optical means including means for separating said images, reversing said inverted image, and projecting one of said images onto each of said eyepieces of said viewing means so as to enable a stereoscopic view to be obtained of said object.

2. A stereoscopic remote viewing system as recited in claim 1 wherein said inspection means includes a plurality of reflective surfaces and a single lens system through which both of said images are simultaneously projected.

3. A stereoscopic remote viewing system as recited in claim 2 wherein said viewing means includes a plurality of reflective surfaces and a single lens system through which both of said images are simultaneously projected.

4. A stereoscopic remote viewing system as recited in claim 3 wherein a servo means is provided for causing said inspection means to follow movement of said viewing means and said optical means so that an observer can selectively scan a remote field of view by merely reorienting said viewing means.

5. A stereoscopic remote viewing system as recited in claim 4 wherein said lens system in said inspection means is of the variable focal length type so as to enable close up views of a selected object to be obtained.

6. A stereoscopic remote viewing system as recited in claim 5 wherein said inspection means includes at least two pivotable reflector means disposed along said optical paths and which are selectively orientatable so as to enable the selective range control of said inspection means.

7. A stereoscopic remote viewing system as recited in claim 6 wherein said inspection means includes an even number of reflective devices operatively disposed along one of said optical paths and an odd number of reflective devices operatively disposed along the other of said optical paths.

8. A stereoscopic remote viewing system as recited in claim 7 wherein said optical means includes an even number of reflective devices operatively disposed along one of the optical paths and an odd number of reflective devices operatively disposed along the other optical path.

9. A stereoscopic remote viewing system as recited in claim 8 wherein said viewing means, optical means and said display are operatively coupled together to form a unitary body which is adapted for being worn upon the head of the observer.

10. A stereoscopic remote viewing system comprising:
a pickup for converting images to a video signal;
binocular object inspection means for simultaneously focusing a pair of images of the same object as viewed from separate locations along separate optical paths onto said pickup;
said inspection means including a plurality of reflective surfaces and a single lens system through which both of said images are simultaneously projected before reaching said pickup;
said inspection means further including means for laterally inverting one of said images and causing said images to be projected through said lens system onto said pickup in a side-by-side mirror-symmetric relationship so that distortion symmetrical to an imaginary vertical axis between said side-by-side images will similarly affect both images;
means for transmitting said video signal to a television receiver including a video display wherein side-by-side mirror-symmetric images representative of said images focused on said pickup are displayed;
a binocular viewer including two eyepieces;
optical means between said video display and said eyepieces for providing first and second isolated optical paths so that only one image can be viewed from each eyepiece, said first path being from one of said displayed images to one of said eyepieces and said second optical path being from said other displayed image to said other eyepiece;
said optical means including a single lens system through which both of said images are simultaneously projected and means for reversing said laterally reversed image before projecting one of said images on each eyepiece so as to enable a stereoscopic view to be obtained of said object.

11. A stereoscopic remote viewing system as recited in claim 10 wherein said optical means includes a plurality of reflective surfaces and a single lens system through which both of said images are simultaneously projected.

12. A stereoscopic remote viewing system as recited in claim 11 wherein a servo means is provided for causing said inspection means to follow movement of said viewing means so that an observer can selectively scan a remote field of view by merely reorienting the viewing means.

13. A stereoscopic remote viewing system as recited in claim 12 wherein said lens system in said inspection means is of the variable focal length type so as to enable close up views of a selected object to be obtained.

14. A stereoscopic remote viewing system as recited in claim 13 wherein said inspection means includes at least two pivotable reflector means disposed along said optical paths and which are selectively orientatable so as to enable the selective range control of said inspection means.

15. A stereoscopic remote viewing system as recited in claim 14 wherein said inspection means includes an even number of reflective devices operatively disposed along one of said optical paths and an odd number of reflective devices operatively disposed along the other of said optical paths.

16. A stereoscopic remote viewing system as recited in claim 15 wherein said optical means includes an even number of reflective devices operatively disposed along one of the optical paths and an odd number of reflective devices operatively disposed along the other optical path.

17. A stereoscopic remote viewing system as recited in claim 16 wherein said viewing means, optical means and said display are operatively coupled together to form a unitary body which is adapted for being worn upon the head of the observer.

* * * * *